(12) United States Patent
Considine et al.

(10) Patent No.: US 9,547,617 B2
(45) Date of Patent: Jan. 17, 2017

(54) PHY IC ACA BRIDGE, RID_B RESISTANCE, AND VBUS VOLTAGE CIRCUITS

(71) Applicant: TEXAS INSTRUMENTS INCORPORATED, Dallas, TX (US)

(72) Inventors: Peter Brendan Considine, Peymeinade (FR); Sylvain Berthout, Saint Laurent du Var (FR); Arnaud Deconinck, Cagnes-sur-mer (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/189,623

(22) Filed: Jun. 22, 2016

(65) Prior Publication Data

US 2016/0306767 A1    Oct. 20, 2016

Related U.S. Application Data

(62) Division of application No. 13/453,379, filed on Apr. 23, 2012, now Pat. No. 9,395,780.

(Continued)

(51) Int. Cl.
| | |
|---|---|
| G06F 13/40 | (2006.01) |
| G06F 13/36 | (2006.01) |
| G06F 13/42 | (2006.01) |
| G06F 1/26 | (2006.01) |
| G06F 3/00 | (2006.01) |

(52) U.S. Cl.
CPC ........... *G06F 13/4027* (2013.01); *G06F 1/266* (2013.01); *G06F 13/36* (2013.01); *G06F 13/4282* (2013.01); *G06F 2213/0042* (2013.01)

(58) Field of Classification Search
CPC ............ G06F 13/36; G06F 13/00; G06F 3/00
See application file for complete search history.

(56) References Cited

U.S. PATENT DOCUMENTS

| | | |
|---|---|---|
| 7,161,523 B1 | 1/2007 | Zortea |
| 7,908,414 B2 | 3/2011 | Combs et al. |

(Continued)

*Primary Examiner* — Henry Tsai
*Assistant Examiner* — Christopher a Daley
(74) *Attorney, Agent, or Firm* — Lawrence J. Bassuk; Charles A. Brill; Frank D. Cimino

(57) ABSTRACT

A physical layer integrated circuit (PHY), including an accessory charger adapter (ACA) bridge circuit to communicate with an ACA via a universal serial bus (USB) cable having at least an ID pin and a VBUS pin. The PHY is also to communicate with an ACA-agnostic USB controller configured to act as an A-device or as a B-device. The ACA comprises a USB accessory port. The ACA bridge circuit comprises detection and control logic configured to detect, based on a resistance sensed on the ID pin, that a B-device is connected to the USB accessory port of the ACA and, as a result of such a detection, generate a signal to the USB controller that causes the USB controller to act as an A-device and ignore a VBUS drive signal from the USB controller that, if not ignored, would cause the PHY to drive the VBUS pin. The detection and control logic is also configured to detect, based on a resistance sensed on the ID pin, that an off/idle A-device or nothing is connected to the USB accessory port of the ACA and, as a result of such a detection, modify a signal to the USB controller that prevents the USB controller from being aware of a voltage on the VBUS pin.

3 Claims, 4 Drawing Sheets

Related U.S. Application Data

(60) Provisional application No. 61/477,930, filed on Apr. 21, 2011.

(56) References Cited

U.S. PATENT DOCUMENTS

| | | | |
|---|---|---|---|
| 8,090,461 B2* | 1/2012 | Ohiaeri | G06Q 30/0621 700/117 |
| 8,362,741 B2* | 1/2013 | Capella | H02J 7/0004 320/107 |
| 8,458,376 B1 | 6/2013 | Chen et al. | |
| 8,560,754 B2 | 10/2013 | Mueller et al. | |
| 8,683,087 B2 | 3/2014 | Connolly | |
| 9,047,808 B2* | 6/2015 | Cho | G09G 3/2092 |
| 9,122,813 B2* | 9/2015 | Oljaca | G06F 13/4081 |
| 9,142,982 B2 | 9/2015 | Chen et al. | |
| 2006/0106962 A1 | 5/2006 | Woodbridge et al. | |
| 2010/0070659 A1* | 3/2010 | Ma | G06F 13/385 710/14 |
| 2010/0109602 A1 | 5/2010 | Chang | |
| 2010/0109795 A1 | 5/2010 | Jones et al. | |
| 2010/0161842 A1 | 6/2010 | Shan et al. | |
| 2010/0169534 A1 | 7/2010 | Saarinen et al. | |
| 2012/0030381 A1* | 2/2012 | Singh | G06F 1/3206 710/16 |
| 2012/0250204 A1 | 10/2012 | Wada et al. | |
| 2013/0275644 A1 | 10/2013 | Li et al. | |
| 2013/0275779 A1 | 10/2013 | He | |
| 2014/0108870 A1 | 4/2014 | Aravindhan | |

\* cited by examiner

FIG. 3

| CASE | CHARGER PORT | ACCESSORY PORT | ID_OTG | OTG BEHAVIOR | IDGND (TO CONTROLLER) | VBUS_VLD DETECTION (TO CONTROLLER) | SESS_VLD DETECTION (TO CONTROLLER) | VBUS_EN (DRIVE VBUS SIGNAL FROM CONTROLLER) |
|---|---|---|---|---|---|---|---|---|
| 1 | NON-CHARGER | NOTHING | RID_FLOAT | IDLE | 1 | 0 | 0 | 0 |
| 2 | NON-CHARGER | B-DEVICE | RID_GND | A-DEVICE | 0 | 1 | 1 | 1 |
| 3 | NON-CHARGER | A-DEVICE OFF | RID_FLOAT | IDLE | 1 | 0 | 0 | 0 |
| 4 | NON-CHARGER | A-DEVICE ON | RID_FLOAT | B-DEVICE | 1 | 1 | 1 | 0 |
| 5 | CHARGER | NOTHING | RID_B | IDLE | 1 | VBUS_VLD AND NOT(RID_B DETECTED) | SESS_VLD AND NOT(RID_B DETECTED) | 0 |
| 6 | CHARGER | B-DEVICE | RID_A | A-DEVICE | IDGND AND NOT(RID_A DETECTED) | 1 | 1 | DRVVBUS AND NOT(RID_A DETECTED) |
| 7 | CHARGER | A-DEVICE OFF | RID_B | IDLE | 1 | VBUS_VLD AND NOT(RID_B DETECTED) | SESS_VLD AND NOT(RID_B DETECTED) | 0 |
| 8 | CHARGER | A-DEVICE ON | RID_C | B-DEVICE | 1 | 1 | 1 | 0 |

300

PHY IC ACA BRIDGE, RID_B RESISTANCE, AND VBUS VOLTAGE CIRCUITS

CROSS-REFERENCE TO RELATED APPLICATIONS

This application is a divisional of prior application Ser. No. 13/453,379, filed Apr. 23, 2012, now U.S. Pat. No. 9,395,780, issued Jul. 19, 2016;

Which claims priority to U.S. Provisional Patent Application No. 61/477,930, filed on Apr. 21, 2011; which is hereby incorporated herein by reference.

BACKGROUND

A universal serial bus (USB) device typically consists of a USB controller or link layer device that connects to a physical USB cable or receptacle through a physical layer integrated circuit (PHY). Standard USB employs a master/slave architecture for communication between USB devices; however, USB On-The-Go (OTG) is a supplement to the USB 2.0 specification that allows USB devices to act either as a host device (acting as the link master) or a peripheral device (acting as the link slave). USB OTG defines USB devices as either an "A-device" or a "B-device" based on which device supplies power and is initially the host. The A-device supplies power and acts as the host whereas the B-device consumes power and acts as the peripheral. USB OTG adds a fifth pin to the standard USB connector, called the ID pin, that enables a USB device to classify itself based on a resistance seen on the ID pin relative to ground. A USB device that has a grounded ID pin plugged into it acts as an A-device whereas a USB device that has a floating ID pin plugged into it acts as a B-device.

The USB 2.0 specification also contains a USB Battery Charging Specification v1.2 that allows USB controllers to be able to detect USB battery chargers connected to the PHY or to function as an A-device or a B-device. An appendix to the Battery Charging Specification defines an accessory charger adapter (ACA), which is a device that allows a USB device to be attached to both a charger and another USB device simultaneously. However, some existing or legacy USB controllers are not designed to support ACA behavior (i.e., are "ACA-agnostic") and can misinterpret signals received from the ACA by the PHY via a USB cable socket, which may cause the legacy USB controller to behave improperly for a given set of parameters.

SUMMARY

The problems noted above are solved in large part by a physical layer integrated circuit (PHY), including an accessory charger adapter (ACA) bridge circuit to communicate with an ACA via a universal serial bus (USB) cable having at least an ID pin and a VBUS pin. The PHY is also to communicate with an ACA-agnostic USB controller configured to act as an A-device or as a B-device. The ACA comprises a USB accessory port. The ACA bridge circuit comprises detection and control logic configured to detect, based on a resistance sensed on the ID pin, that a B-device is connected to the USB accessory port of the ACA and, as a result of such a detection, generate a signal to the USB controller that causes the USB controller to act as an A-device and ignore a VBUS drive signal from the USB controller that, if not ignored, would cause the PHY to drive the VBUS pin. The detection and control logic is also configured to detect, based on a resistance sensed on the ID pin, that an off/idle A-device or nothing is connected to the USB accessory port of the ACA and, as a result of such a detection, modify a signal to the USB controller that prevents the USB controller from being aware of a voltage on the VBUS pin.

Additionally, the problems noted above are solved in large part by an On-The-Go (OTG) device, including an accessory charger adapter (ACA)-agnostic USB controller configured to act as an A-device or as a B-device, and a physical layer integrated circuit (PHY) coupled to the ACA-agnostic USB controller. The PHY comprises an ACA bridge circuit to communicate with an ACA via a universal serial bus (USB) cable having at least an ID pin and a VBUS pin and to communicate with the ACA-agnostic USB controller. The ACA comprises a USB accessory port. The ACA bridge circuit comprises detection and control logic configured to detect, based on a resistance sensed on the ID pin, that a B-device is connected to the USB accessory port of the ACA and, as a result of such a detection, generate a signal to the USB controller that causes the USB controller to act as an A-device and ignore a VBUS drive signal from the USB controller that, if not ignored, would cause the PHY to drive the VBUS pin. The detection and control logic is also configured to detect, based on a resistance sensed on the ID pin, that an off/idle A-device or nothing is connected to the USB accessory port of the ACA and, as a result of such a detection, modify a signal to the USB controller that prevents the USB controller from being aware of a voltage on the VBUS pin.

Further, the problems noted above are solved in large part by a method, including detecting, by a physical layer integrated circuit (PHY) and based on a resistance sensed on an ID pin of a universal serial bus (USB) cable coupled to an accessory charger adapter (ACA), that a B-device is connected to a USB accessory port of the ACA. The method also includes generating, as a result of detecting that a B-device is connected to the USB accessory port, a signal to a ACA-agnostic USB controller that causes the USB controller to act as an A-device and ignore a VBUS drive signal from the USB controller that, if not ignored, would cause the PHY to drive a VBUS pin of the USB cable. Still further, the method includes detecting, by the PHY and based on a resistance sensed on the ID pin, that an off/idle A-device or nothing is connected to the USB accessory port of the ACA. The method also includes modifying, as a result of detecting that an off/idle A-device or nothing is connected to the USB accessory port, a signal to the USB controller that prevents the USB controller from being aware of a voltage on the VBUS pin.

BRIEF DESCRIPTION OF THE DRAWINGS

For a detailed description of exemplary embodiments of the invention, reference will now be made to the accompanying drawings in which:

FIG. 3 shows a logic table in accordance with various embodiments;

NOTATION AND NOMENCLATURE

Figure 1:
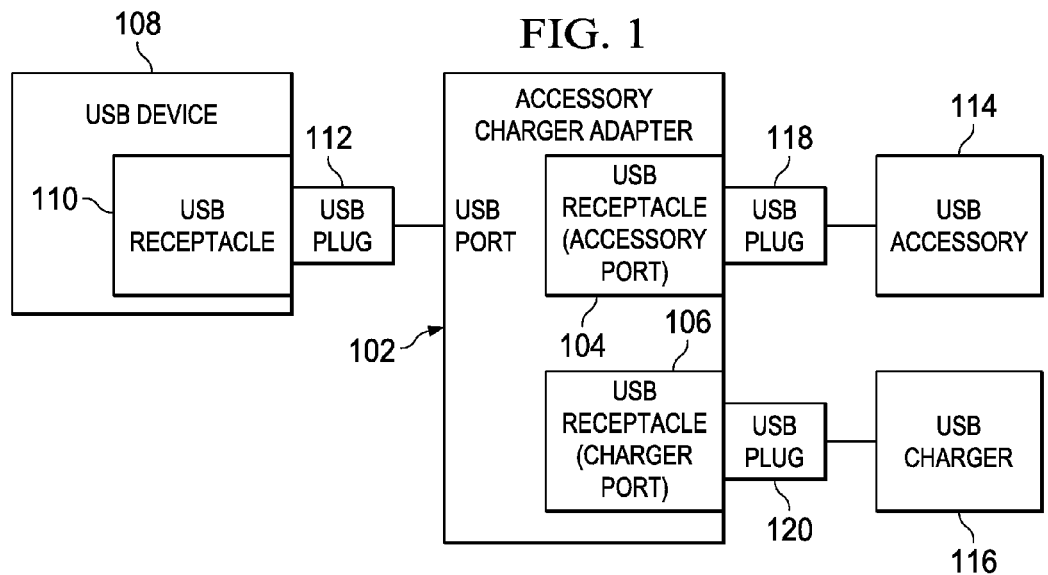
FIG. 1 shows a device connectivity schematic in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "On-The-Go (OTG) device" refers to a Universal Serial Bus (USB) device that complies with the USB OTG specification.

As used herein, the term "Accessory Charger Adapter (ACA)" refers to a device that contains a charger port for connecting to a USB charger, an accessory port for connecting to a USB accessory, and a USB port for connecting to a USB device.

As used herein, the term "A-device" refers to a USB device that is acting as a host. As used herein, the term "B-device" refers to a USB device that is acting as a peripheral. In certain circumstances, such as where a device supports the OTG specification, the device may transition from a role of A-device to a role of B-device and vice versa.

As used herein, the term "ACA-agnostic" or "legacy" refers to a USB controller or a USB device containing a USB controller that does not support the ACA specification.

As used herein, the terms "RID_A," "RID_B," and "RID_C" refer to resistance values seen on an ID pin of a USB cable that indicate various states of an ACA.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As explained above, some existing or legacy USB controllers are not designed to support ACA behavior (i.e., are "ACA-agnostic") and can misinterpret signals received from the ACA by the physical layer integrated circuit (PHY) via a USB cable socket, which may cause the legacy USB controller to behave improperly for a given set of parameters. For example, prior to the ACA specification, a USB device (which may be an OTG device) comprising a legacy USB controller determined its state (e.g., A-device or B-device) based on whether the resistance seen on an ID pin of a USB cable coupled to a PHY of the USB device was grounded or floating with respect to ground. If the ID pin was grounded, the USB device assumed the role of an A-device; if the ID pin was floating, the USB device assumed the role of a B-device. The ACA specification, however, relies on additional resistance values presented on the ID pin with respect to ground to indicate different configurations, such as a USB charger being plugged into the charger port of the ACA in combination with either nothing, a B-device, an off/idle A-device, or an on A-device being plugged into the accessory port of the ACA. These resistance values are not understood by the legacy USB controller and, in some cases, cause a conflict in behavior of the legacy USB controller. In particular, an ACA with a B-device plugged into its accessory port will not present ground on the ID pin, so a legacy USB controller will not know that it should assume the role of an A-device.

Additionally, a USB device (which may be an OTG device) comprising a legacy USB controller may rely on the presence of VBUS (i.e., the voltage on the VBUS pin of a USB cable being above an acceptable threshold) for certain behavior. For example, when VBUS is not provided to the USB device and the USB device is not required to provide VBUS as a result of being connected to nothing or to an off/idle A-device, the USB device itself may turn off. However, in the presence of an ACA with a USB charger plugged into its charger port, VBUS is always being supplied to the USB device (e.g., via the ACA charger). This may cause the legacy USB controller to attempt to configure itself as a B-device or otherwise not transition to an off state.

As yet another example, a USB device (which may be an OTG device) comprising a legacy USB controller may determine to drive the VBUS pin in certain cases, such as when the USB controller configures itself or is otherwise configured as an A-device. However, in the presence of an ACA with a USB charger plugged into its charger port, VBUS is always being supplied to the USB device (e.g., via the ACA). Thus, contention (e.g., a short circuit) will occur if the USB controller causes the PHY of the USB device to drive the VBUS pin because both the USB device and the ACA are attempting to drive the same pin.

Many USB devices comprising legacy USB controllers are currently being sold today. However, the cost to replace the legacy hardware controllers of these devices so that they may interact with ACAs and the like is prohibitive. Thus, in accordance with various embodiments, a system and method for enabling communication between an ACA and a USB device comprising an ACA-agnostic or legacy USB controller are provided.

Referring to FIG. 1, a system 100 is shown in accordance with various embodiments. The system 100 comprises an ACA 102 comprising a USB port, an accessory port, and a charger port. As shown, the accessory port and charger port comprise USB receptacles 104, 106 respectively and the USB port comprises a USB cable that terminates in a USB plug 112. The accessory port receptacle 104 is configured to receive a USB plug 118 from a USB accessory 114. Likewise, the charger port receptacle is configured to receive a USB plug 120 from a USB charger 116. In some embodiments, the charger port may be replaced or supplemented by an embedded charger having a captive cable. The USB plug 112 may couple to a USB device 108 via its USB receptacle 110. In some embodiments, the plugs and receptacles may be standard-, mini-, or micro-USB types. Additionally, the present disclosure is not limited by the type of plug and receptacle, and thus future USB interconnects are similarly within the scope of this disclosure.

In accordance with the ACA specification, the USB device 108 and the USB accessory 114 should be able to communicate regardless of whether the USB accessory 114 configures itself or is otherwise configured as an A-device or a B-device, while the USB charger 116 supplies VBUS to the USB device 108 and/or the USB accessory 114. One skilled in the art appreciates that numerous other combinations of receptacles, cables, and plugs may be possible and the above are shown for exemplary purposes. Additionally, while shown separately, the charger 116 and/or the USB accessory device 114 may be physically integrated within the ACA 102.

Figure 2:
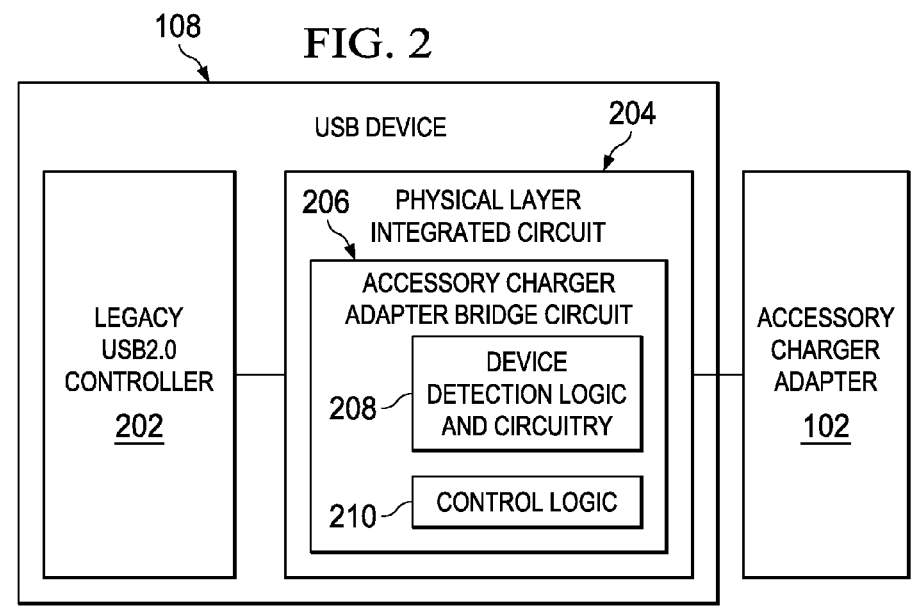
FIG. 2 shows a USB device schematic in accordance with various embodiments.

Turning now to FIG. 2, the USB device 108 is shown in further detail in accordance with various embodiments. The USB device 108 comprises a legacy or ACA-agnostic USB controller 202, which is coupled to a PHY 204 through an interface 203, such as a Utmi+ low pin interface (ULPI). The PHY 204 couples the USB controller 202 with a physical medium, such as USB cable 211, which may be in turn coupled to an ACA 102 as shown in FIG. 1.

In accordance with various embodiments, the PHY 204 comprises an ACA bridge circuit 206 that enables communication between the ACA 102 and the USB controller 202, which is a legacy controller and thus does not adhere to the ACA specification. As shown, the ACA bridge circuit 206 comprises device detection logic and circuitry 208 and control logic 210, whose function will be explained in further detail below. The logic blocks may be combined into one logic block, separated into more than two logic blocks, or implemented as software executing within the PHY 204. Additionally, the present disclosure is intended to cover the functionality of the device detection logic and circuitry 208 and control logic 210 even when implemented separately from the PHY 204.

Turning now to FIG. 3, a table 300 of ACA modes is shown. For brevity, a '1' in the table 300 corresponds to an asserted state while a '0' in the table 300 corresponds to a deasserted state. One skilled in the art appreciates that asserted and deasserted states may correspond to different voltage levels in different cases. Additionally, in cases 5, 6 and 7, certain logic statements are shown. It should be understood that, in accordance with various embodiments, these logic statements apply to the entire column, however are shown only in the specific instances in which they alter the outcome for that column relative to the typical behavior of a legacy USB controller. In cases 1-4, where no charger is plugged into the charger port 106 of the ACA 102, no intervention is required by the logic 208, 210 of the PHY 204. This is because VBUS is not being constantly supplied and the resistance values (i.e., ground or float) seen on the ID pin are known by the ACA-agnostic controller, such as USB controller 202. Essentially, in cases 1-4, the ACA behaves as a conduit between the USB device 108 and the accessory device 114, which may communicate according to the USB (and optionally the USB OTG) specification. Specifically, in cases 1-4, the VBUS pin of the USB port is shorted to the VBUS pin of the accessory port 104 while the charger is not present.

However, in accordance with various embodiments, in cases 5-8, the logic and circuitry 208, 210 of the PHY 204 intervenes in certain situations to ensure that the behavior of both the ACA-agnostic controller, such as USB controller 202, and the PHY 204 are correct and according to the ACA specification. For example, in the case where a USB charger 116 is plugged into the charger port 106 of the ACA 102 and a B-device 114 is plugged into the accessory port 104 of the ACA 102, the ACA 102 will cause a resistance value RID_A to be seen by the USB device 108 on the ID pin of USB receptacle 110. However, RID_A corresponds to a resistance value relative to ground, which may be larger than the maximum resistance value allowable to be detected as ground, and thus will not be detected by the PHY 204 as ground. This would normally cause an IDGND signal (e.g., where being deasserted indicates the presence of ground on the ID pin) to be asserted, which in the presence of VBUS, would cause the USB device 108 to configure itself or otherwise be configured as a B-device (e.g., case 4). In fact, in this case, the USB device 108 should configure itself or otherwise be configured as an A-device because a B-device 114 is plugged into the accessory port 104 of the ACA 102.

In accordance with various embodiments, an RID_A resistance detection circuit, which will be explained in further detail below, is used by the detection logic and circuitry 208 to detect the presence of a resistance on the ID pin that corresponds to RID_A. Furthermore, an RID_GND resistance detection circuit, which may drive the IDGND signal presented to the USB controller 202 in legacy devices, is used by the detection logic and circuitry 208 to detect whether the ID pin is grounded. As explained above, the RID_GND resistance detection outputs a deasserted signal when the ID pin is grounded or an asserted signal in any other case. In accordance with various embodiments, the detection logic and circuitry 208 and/or control logic 210 logically ANDS the inverse of the output of the RID_A resistance detection circuit and the RID_GND resistance detection circuit and uses the output of the logical AND operation to drive the IDGND control signal for the USB controller 202. Thus, in all cases other than case 6, the inverse of the RID_A detection is asserted, which allows the detection of RID_GND to "pass through" the AND operation, which results in appropriate OTG device behavior. However, when RID_A is detected, the IDGND control signal is driven to be deasserted, which causes the USB device 108 to configure itself or otherwise be configured as an A-device in case 6, where it would otherwise incorrectly configure itself or otherwise be configured as a B-device.

As another example, in the case where a USB charger 116 is plugged into the charger port 106 of the ACA 102 and a B-device 114 is plugged into the accessory port 104 of the ACA 102, the detection logic and circuitry 208 will cause the USB device 108 to configure itself or otherwise be configured as an A-device as explained above. One typical role of an A-device is to provide a VBUS voltage supply, and thus the USB controller 202 asserts a VBUS drive signal (shown in the table 300 as DRVVBUS) that would normally cause the PHY 204 or an external VBUS source to drive the VBUS pin. However, in this case, the ACA 102 is providing VBUS, and if the PHY 204 also attempted to drive the VBUS pin, there would be contention on VBUS (e.g., a short circuit).

In accordance with various embodiments, an RID_A resistance detection circuit, which will be explained in further detail below, is used by the detection logic and circuitry 208 to detect the presence of a resistance on the ID pin that corresponds to RID_A. The VBUS drive signal (shown as DRVVBUS) from the USB controller 202 is asserted when the USB controller 202 determines to drive the VBUS pin. In accordance with various embodiments, the detection logic and circuitry 208 and/or control logic 210 logically ANDS the inverse of the output of the RID_A resistance detection circuit and the VBUS drive signal from the USB controller 202 to produce a modified VBUS drive signal (shown as VBUS_EN), which is used by the PHY 204 to determine whether to drive the VBUS pin. Thus, in all cases other than case 6, the inverse of the RID_A detection is asserted, which allows the VBUS drive signal from the USB controller 202 to "pass through" the AND operation, which results in the PHY driving the VBUS pin only in case 2 when the USB device 108 configures itself or otherwise is configured as an A-device and there is no charger present. However, when RID_A is detected, the modified VBUS drive signal is driven to be deasserted, which prevents the PHY 204 or external voltage source from driving the VBUS pin, which would cause contention because a voltage is already being supplied to the VBUS pin by the ACA 102 in case 6.

As yet another example, in the case where a USB charger 116 is plugged into the charger port 106 of the ACA 102 and an off/idle A-device 114 or nothing is plugged into the accessory port 104 of the ACA 102, the ACA 102 will cause a resistance value RID_B to be seen by the USB device 108 on the ID pin of USB receptacle 110, which may interpreted as floating, or rather, not ground. However, VBUS is present because it is supplied by the ACA 102. This would normally cause the USB device 108 to configure itself or otherwise be configured as a B-device (e.g., case 4). In fact, in this case, the USB device 108 should remain in or transition to an off or idle state, because an off/idle A-device 114 or nothing is plugged into the accessory port 104 of the ACA 102, similar to cases 1 and 3.

In accordance with various embodiments, an RID_B resistance detection circuit, which will be explained in further detail below, is used by the detection logic and circuitry 208 to detect the presence of a resistance on the ID pin that corresponds to RID_B. Furthermore, a VBUS voltage circuit is used by the detection logic and circuitry 208 to detect whether VBUS is being provided (shown in the table 300 as VBUS_VLD and SESS_VLD). In accordance with various embodiments, the detection logic and circuitry 208 and/or control logic 210 logically ANDS the inverse of the output of the RID_B resistance detection circuit and the output of the VBUS voltage circuit to produce a VBUS present signal. The PHY 204 sends the VBUS present signal to the USB controller 202 to cause the USB controller 202 to be aware of the presence of VBUS (if the VBUS present signal is asserted) or to be unaware of the presence of VBUS (if the VBUS present signal is deasserted). Thus, in all cases other than 5 and 7, the inverse of the RID_B detection is asserted, which allows the output of the VBUS voltage circuit to "pass through" the AND operation, which results in the USB controller 202 to be aware or unaware of VBUS based solely on the presence or absence of VBUS, respectively. However, when RID_B is detected (as in cases 5 and 7), the VBUS present signal is driven to be deasserted, which prevents the USB controller 202 from being aware of VBUS, allowing the USB controller 202 to remain in or transition to an off or idle state, similar to cases 1 and 3.

Further, in some situations, both A-devices and B-devices may communicate through a handshake on the VBUS pin according to a session request protocol (SRP) explained in the USB OTG specification. In particular, this may occur when one of the devices is off or unattached, as shown in cases 5 and 7, which may also cause contention on the VBUS pin, because VBUS is being supplied by the ACA 102. In this case, the detection logic and circuitry 208 and/or control logic 210 may mask SRP pullup and/or pulldown signals such that the USB device 108 is not able to initiate any SRP handshake communications on the VBUS pin.

Figure 4A:
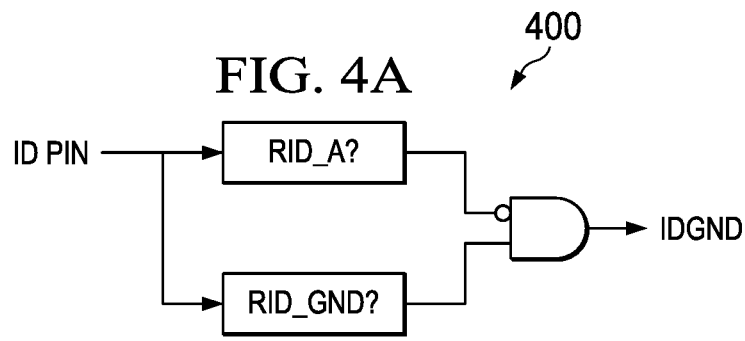
FIGS. 4a-4c show various detection logic diagrams in accordance with various embodiments.
Figure 4B:
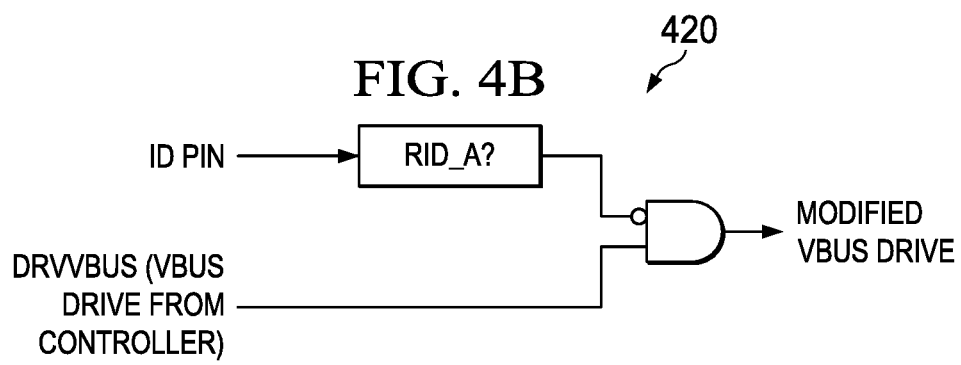
Figure 4C:
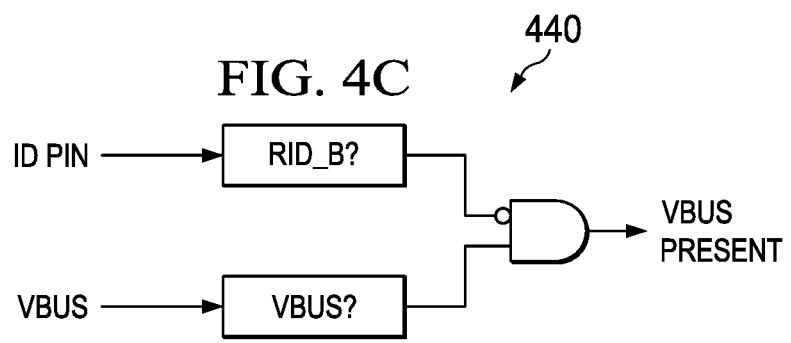

Turning now to FIGS. 4a-4c, logic diagrams 400, 420, 440 are shown that perform the functionality explained above. In FIG. 4a, the output of the RID_A detection circuit is asserted if a resistance corresponding to RID_A is sensed on the ID pin and the output of the RID_GND detection circuit is deasserted if ground is sensed on the ID pin. Thus, the resultant IDGND signal satisfies the behavior constraints of case 6 shown in FIG. 3.

In FIG. 4b, the output of the RID_A detection circuit is asserted if a resistance corresponding to RID_A is sensed on the ID pin. The DRVVBUS signal corresponds to a signal from the USB controller 202 instructing the PHY 204 or an external voltage source to drive VBUS. Thus, when RID_A is detected, the modified VBUS drive signal is not asserted and thus the PHY 204 or external voltage source does not attempt to drive VBUS, which avoids contention because the ACA 102 is already driving VBUS in case 6 shown in FIG. 3.

In FIG. 4c, the output of the RID_B detection circuit is asserted if a resistance corresponding to RID_B is sensed on the ID pin. The output of the VBUS detection circuit is asserted if a voltage above a threshold corresponding to the presence of VBUS is detected. For example, if VBUS is 5.0V, the threshold may be set nominally at 4.6V, such that any VBUS above 4.6V results in the VBUS detection circuit outputting an asserted signal. Thus, when RID_B is detected, the USB controller 202 is prevented from being aware of VBUS, since in both cases 5 and 7, the USB controller 202 should be unaware of VBUS so that it may remain in or transition to an off or idle state.

One skilled in the art appreciates that the above logic diagrams may be implemented in various other ways, not all of which are shown for brevity. Additionally, while shown as utilizing hardware such as AND gates and the like, portions of the above logic diagrams may be similarly implemented in software, for example running on the PHY 204. Furthermore, the various detection circuits may detect resistances and voltages in a number of ways, for example through the use of one or more comparators that result in the assertion of a signal in the presence of the value being detected, or deassertion of the signal in the absence of the value being detected. In some cases, the detection of a value may be subject to a tolerance.

Figure 5:
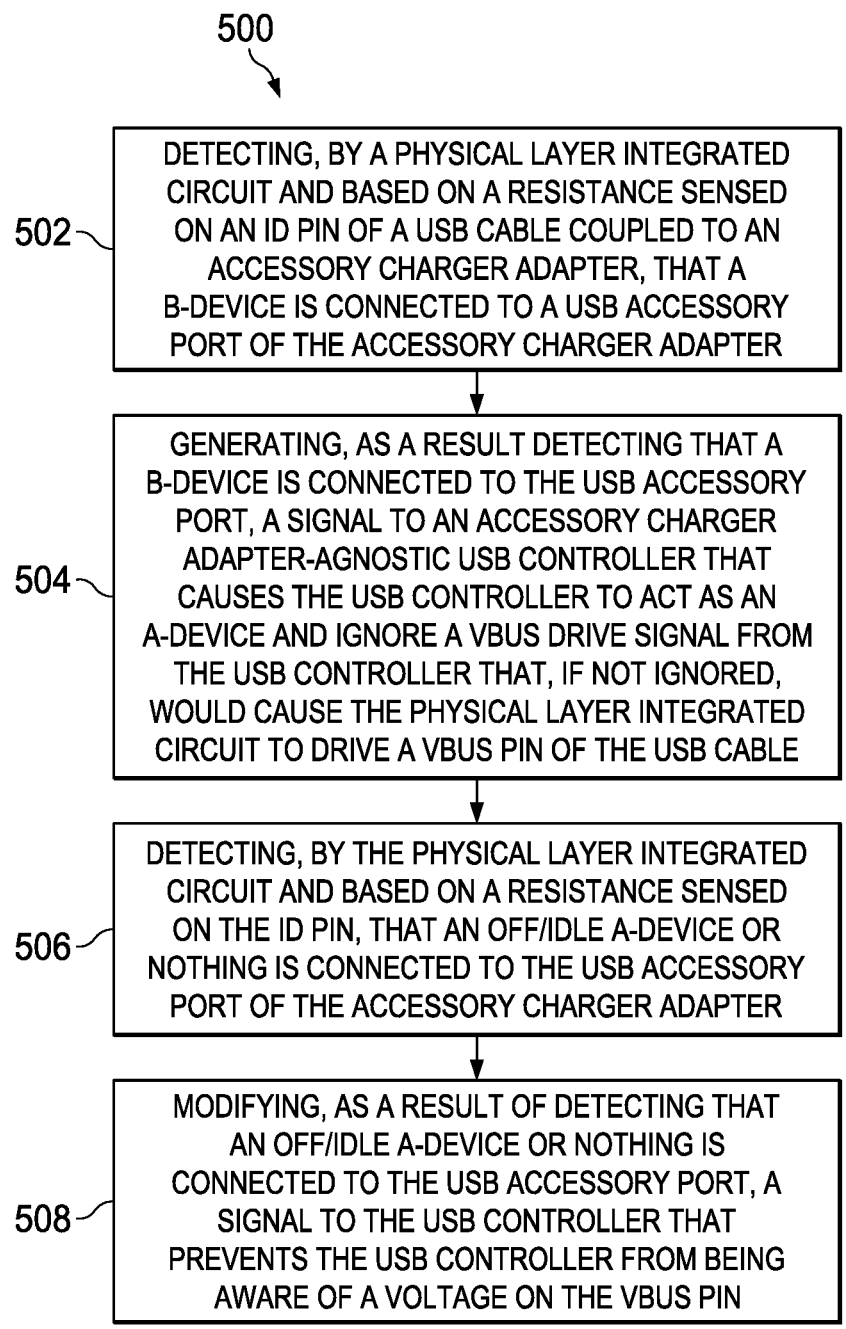
FIG. 5 shows a method flowchart in accordance with various embodiments.

Turning now to FIG. 5, a method 500 is shown in accordance with various embodiments. The method begins in block 502 with detecting, by a PHY 204 and based on a resistance sensed on an ID pin of a USB cable coupled to an ACA 102, that a B-device 114 is connected to a USB accessory port 104 of the ACA 102. The method continues in block 504 with generating, as a result of detecting that a B-device 114 is connected to the USB accessory port 104, a signal to an ACA-agnostic USB controller 202 that causes the USB controller 202 to act as an A-device and ignore a VBUS drive signal from the USB controller 202 that, if not ignored, would cause the PHY 204 to drive a VBUS pin of the USB cable 211.

The method continues in block 506 with detecting, by the PHY 204 and based on a resistance sensed on the ID pin, that an off/idle A-device or nothing is connected to the USB accessory port 104 of the ACA 102. The method concludes in block 508 with modifying, as a result of detecting that an off/idle A-device or nothing is connected to the USB accessory port 104, a signal to the USB controller 202 that prevents the USB controller 202 from being aware of a voltage on the VBUS pin.

The above discussion is meant to be illustrative of the principles and various embodiments of the present invention. Numerous variations and modifications will become apparent to those skilled in the art once the above disclosure is fully appreciated. For example, while certain signal values (e.g., a '1' bit or a '0' bit) have been described as having particular meanings, this is for exemplary purposes only. One skilled in the art appreciates that various other logical implementations of the present disclosure could be used, and all such implementations are within the scope of this disclosure. It is intended that the following claims be interpreted to embrace all such variations and modifications.

What is claimed is:

1. A physical layer integrated circuit (PHY), comprising:
   (a) an accessory charger adapter (ACA) bridge circuit to communicate with an ACA via a universal serial bus (USB) cable having at least an ID pin and a VBUS pin and to communicate with an ACA-agnostic USB controller configured to act as an A-device or as a B-device, the ACA including a USB accessory port that includes detection and control logic configured to:
      (i) detect, based on a resistance sensed on the ID pin, that a B-device is connected to the USB accessory port of the ACA and, as a result of such a detection, generate a signal to the USB controller that causes the USB controller to act as an A-device and ignore a VBUS drive signal from the USB controller that, if not ignored, would cause the PHY to drive the VBUS pin; and
      (ii) detect, based on a resistance sensed on the ID pin, that an off/idle A-device or nothing is connected to the USB accessory port of the ACA and, as a result of such a detection, modify a signal to the USB controller that prevents the USB controller from being aware of a voltage on the VBUS pin; and
   (b) the bridge circuit including a RID_A resistance circuit configured to output an asserted signal when the resistance sensed on the ID pin indicates that a B-device is connected to the USB accessory port of the ACA and a USB charger is connected to a charger port of the ACA or a deasserted signal in any other case;
   (c) the VBUS drive signal from the USB controller is an asserted signal when the USB controller determines to drive the VBUS pin; and
   (d) the detection and control logic produces a modified VBUS drive signal by performing a logical AND operation of the VBUS drive signal from the USB controller and the inverse of the output of the RID_A resistance circuit; and
   (e) the modified VBUS drive signal being a '0' bit causes the PHY not to drive the VBUS pin and the modified VBUS drive signal being asserted causes the PHY to drive the VBUS pin.

2. The PHY of claim 1 wherein the detection and control logic is further configured to, as a result of a detection that an off/idle A-device is connected to the USB accessory port of the ACA, mask signals from the USB controller that would otherwise cause a conflict on the VBUS pin.

3. The PHY of claim 2 wherein the signals from the USB controller that would otherwise cause a conflict on the VBUS pin comprise signals that enable session request protocol (SRP) communication on the VBUS pin.

* * * * *